United States Patent [19]

Daumueller et al.

[11] Patent Number: 5,031,081
[45] Date of Patent: Jul. 9, 1991

[54] HEADLAMP FOR POWER VEHICLE

[75] Inventors: Hans Daumueller, Bodelshausen; Karl-Otto Dobler, Reutlingen; Heinz Ruckwied, Kusterdingen-Wankbeim; Friedrich Schauwecker, Pfullingen, all of Fed. Rep. of Germany

[73] Assignee: Robert Bosch GmbH, Stuttgart, Fed. Rep. of Germany

[21] Appl. No.: 605,031

[22] Filed: Oct. 26, 1990

[30] Foreign Application Priority Data

Dec. 6, 1989 [DE] Fed. Rep. of Germany ....... 3940282

[51] Int. Cl.$^5$ .............................................. F21M 3/18
[52] U.S. Cl. ..................................... 362/66; 362/269; 362/427; 33/379; 33/384
[58] Field of Search .................... 362/61, 66, 285, 287, 362/427, 80, 269; 33/365, 370, 379, 384, 387, 388, 389

[56] References Cited

U.S. PATENT DOCUMENTS

| | | | |
|---|---|---|---|
| 2,058,743 | 10/1936 | Trippe | 362/311 |
| 4,660,128 | 4/1987 | Berain | 362/61 |
| 4,794,495 | 12/1988 | McMahan et al. | 362/66 |
| 4,802,067 | 1/1989 | Ryder et al. | 362/61 |
| 4,916,583 | 4/1986 | Nagasawa | 362/61 |

Primary Examiner—Ira S. Lazarus
Assistant Examiner—Richard R. Cole
Attorney, Agent, or Firm—Michael J. Striker

[57] ABSTRACT

A headlamp for a power vehicle comprises a reflector mountable in a chassis and turnable for adjusting its inclination, a water level provided on the reflector for controlling its inclination, the water level having adjusting marks and being displaceable relative to the reflector for reflector specific fine adjustment, a support insertable in the reflector and receiving the water level, the water level having an outer side and provided on the outer side with a cover glass forming a part of an outwardly curved spherical surface, the water level being turnable in the support for fine adjustment about a vertical axis.

15 Claims, 3 Drawing Sheets

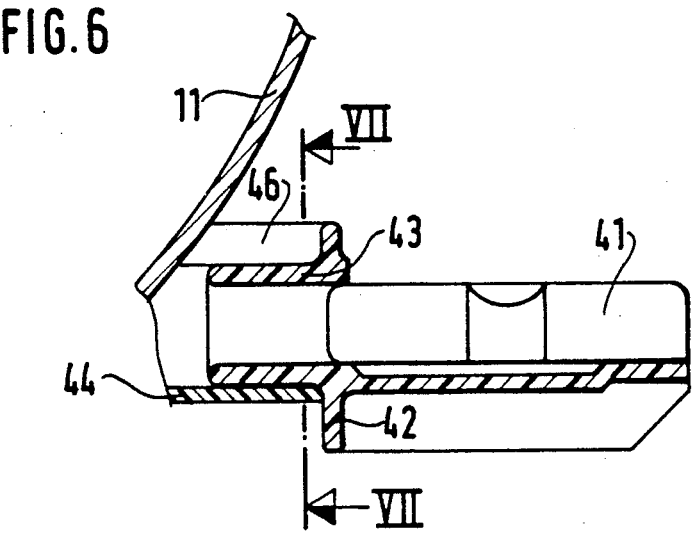
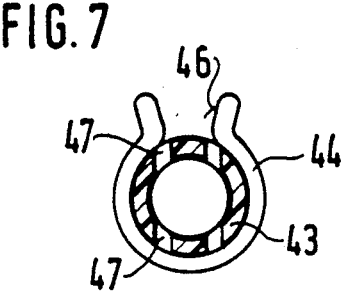
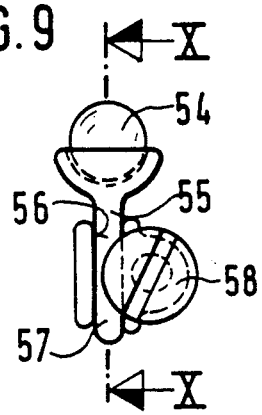
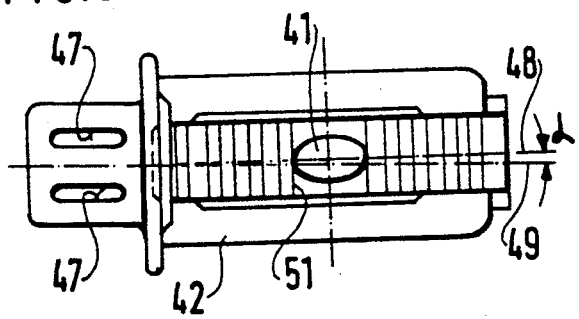
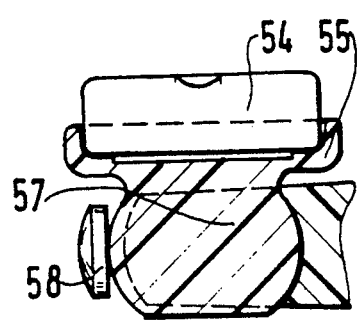

HEADLAMP FOR POWER VEHICLE

BACKGROUND OF THE INVENTION

The present invention relates to a headlamp for a power vehicle.

More particularly, it relates to a headlamp provided with a water level.

Headlamps of the above mentioned general type are known in the art. One of such headlamps is disclosed for example in the U.S. Pat. No. 4,802,067. This headlamp has a reflector provided with a water level which is arranged in a support. The inclination of the reflector is determined by the water level. The support is turnable relative to the reflector by a hinge, so that a compensation of eventual manufacturing tolerances of the reflector is possible, which require a deviating inclination of the reflector to provide a predetermined adjustment of the light bundle produced by the headlamp. The support is transparent and formed as a triangle, so that the water level is arranged along a first leg of the support, while the second leg of the support is formed as a reflective surface. The water level can be read from the side of the third leg and during adjustment must not be directly visible. This construction of the support is too expensive for a series production and therefore costly.

SUMMARY OF THE INVENTION

Accordingly, it is an object of the present invention to provide a headlamp which avoids the disadvantages of the prior art.

More particularly, it is an object of the present invention to provide a headlamp in which the support has a simple construction and is easy to produce and the water level is adjustable.

In keeping with these objects and with others which will become apparent hereinafter, one feature of the present invention resides, briefly stated, in a headlamp of the above mentioned general type in which the water level has on its outer surface a cover glass forming a part of an outwardly curved spherical surface, and is rotatable in the support for fine adjustment about a vertical axis.

When the headlamp is designed in accordance with the present invention, it eliminates the disadvantages of the prior art and provides for the above mentioned highly advantageous results.

In accordance with another feature of the present invention, the central point of the spherical outer surface is laterally displaceable relative to a vertical axis. In this construction with the water level a great inclination of the reflector can be determined with high accuracy.

Still another feature of the present invention is that the receptacle for the support has guiding grooves which narrow in the insertion direction, and the arms of the support are elastically deformable transversely to the narrowing so that the arms during insertion in the guiding grooves are clamped in them. In this construction the support is clamped during insertion in the receptacle automatically.

Still another feature of the present invention is that the water level is arch shaped, and the support has a cylindrical mandrel insertable in a cylindrical receptacle extending parallel to the optical axis of the reflector. The support is turnable in the receptacle for fine adjustment of the water level, and the longitudinal axis of the water level extends under an angle α relative to the longitudinal axis of the receptacle. With this construction a further simplification of the support is achieved.

In accordance with still a further feature of the present invention, the water level is arch-shaped and the receptacle is provided with a vertical slot extending parallel to the optical axis of the reflector. A vertical disc-shaped portion of the support is insertable in the slot. The end side of the portion lying transverse to the vertical is circularly arch shaped, and the limiting wall of the slot is also circularly arch shaped. The support is clamped in the slot between the clamping screw and the limiting wall. Here a reliable fixing of the support and receptacle is provided.

Finally, the reflector is arranged in a housing provided with an observation window or at least one transparent portion so that the water level is readable from outside of the housing, without removal of respective parts of the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 6 is a view showing a second embodiment of the water level on the side view;

FIG. 7 is a view showing the water level of FIG. 6 in section, taken along the line VII—VII in FIG. 6;

FIG. 8 is a view showing the water level of FIG. 6 on a plan view;

FIG. 9 is a view showing a third embodiment of the water level on a front view; and FIG. 10 is a view showing a water level in section taken along the line X—X in FIG. 9.

DESCRIPTION OF THE PREFERRED EMBODIMENTS

Figure 1:
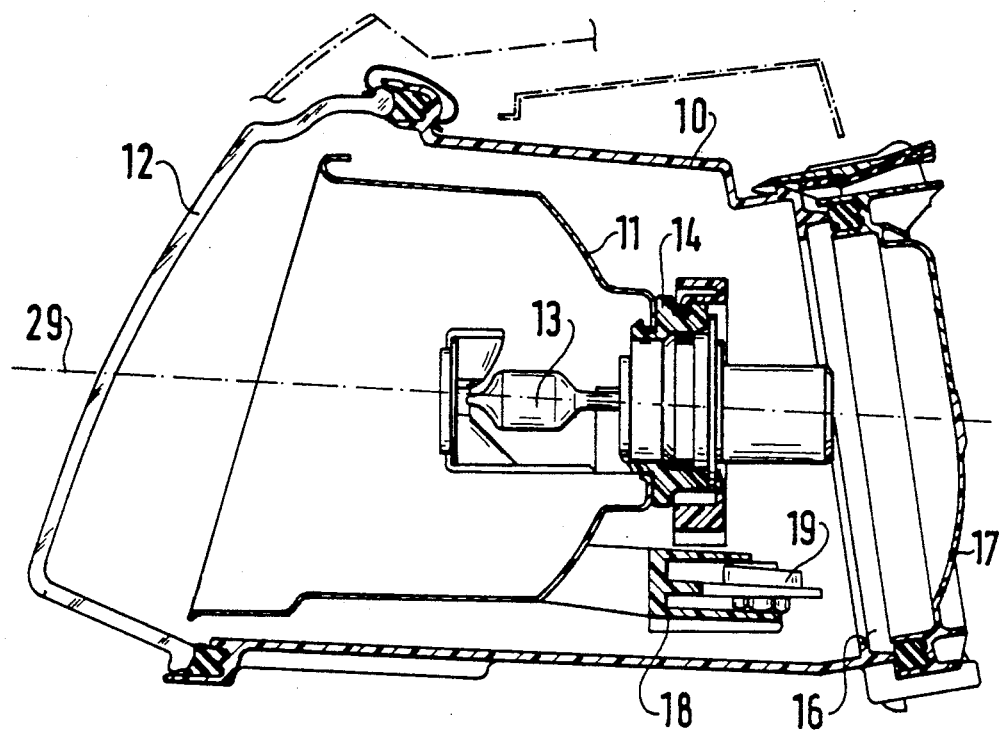
FIG. 1 is a view showing a first embodiment of a headlamp with a water level in accordance with the present invention, on a longitudinal section.

A headlamp for a power vehicle shown in FIG. 1 has a housing 10, a reflector 11 arranged in the housing, and a light disc 12 which covers a light outlet opening of the housing. A lamp carrier 14 which receives an incandescent lamp 13 is inserted in the reflector 11 in an opening in its apex region. The housing 10 has an opening 16 at its rear side. The opening 16 is closed by a cover cap 17. The reflector 11 is displaceable in the housing 10 by means of not shown displacing elements to assume its inclined position. A water level 19 is arranged in a receptacle 18 formed on the reflector 11 at its rear side underneath the opening 16. Its air bubble 20 assumes a position which depends on the inclination of the reflector 11 and therefore forms an indicating element for the inclination of the reflector 11.

Figure 2:
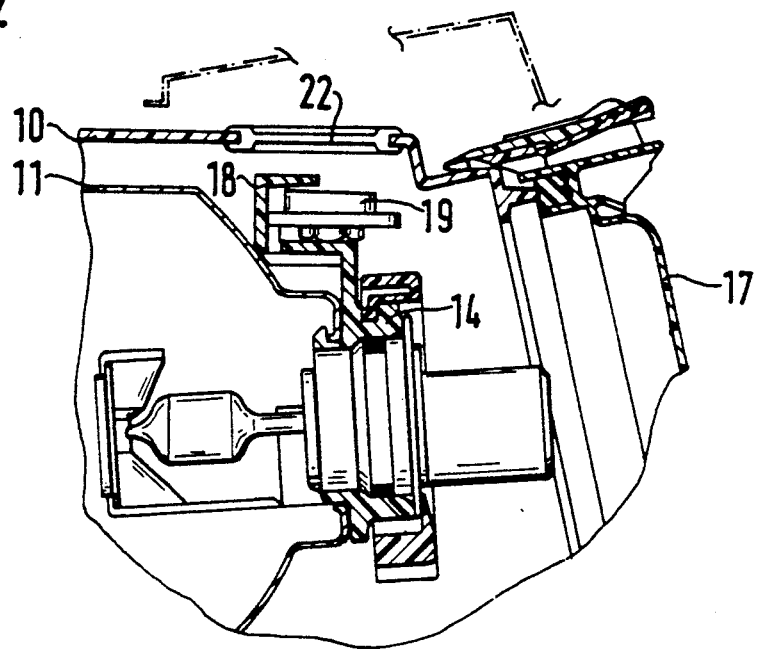
FIG. 2 is a view showing a variant of the headlamp of FIG. 1.

In a first embodiment shown in FIG. 1, the cover cap 17 is transparent, so that the water level 19 can be read from the rear side of the housing 10 without removing of corresponding parts. In the variant shown in FIG. 2, the receptacle 18 on the lamp support 14 is formed to the upper side of the housing 10 and the housing on its upper side is provided with an observation window 22 or is at least partially transparent. Therefore, the water level 19 can be read from outside of the housing. The water level 19 is displaceable in the receptacle 18 so as to provide an adjustment to an individual reflector when due to manufacturing tolerances an inclination adjustment is required in the case when the receptacle 18 is arranged not horizontally.

Figure 3:
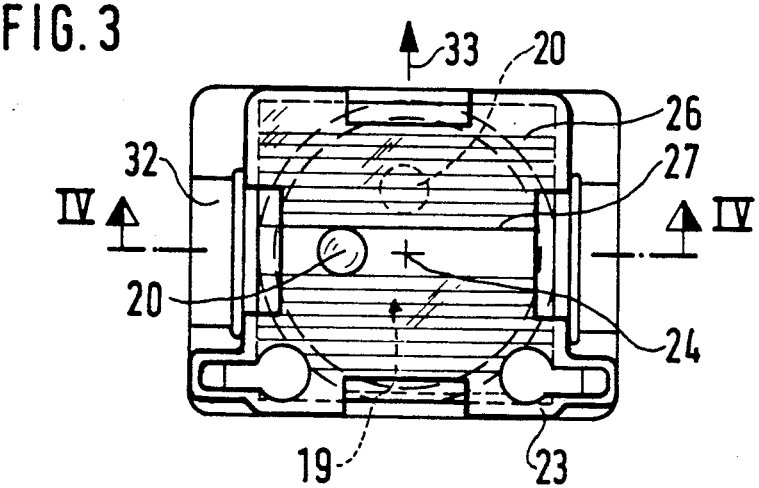
FIG. 3 is a view showing the water level of the headlamp of FIG. 1 on a plan view.
Figure 4:
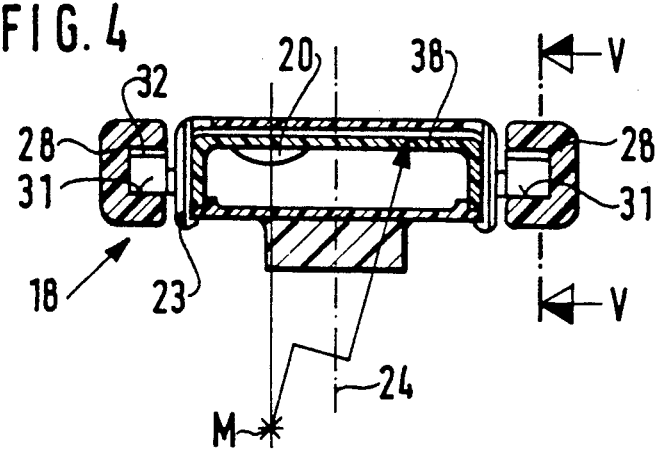
FIG. 4 is a view showing the water level of FIG. 3 in section, taken along the line IV—IV in FIG. 3.
Figure 5:
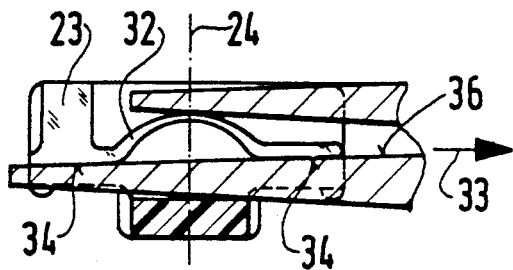
FIG. 5 is a view showing the water level of FIG. 3 in section taken along the line V—V in FIG. 4.

The water bubble 18 of the first embodiment is shown FIG. 3–5. The water bubble 19 is formed as a round disc, a so-called bubble level, and arranged in quadrangular support 23. The water level 19 is rotatable in the support 23 by its circular arcuate edge surface about a vertical axis 24. The transparent cover 26 is arranged over the water level 19 on the support 23 and provided with a line scale 27 with lines which are offset relative to one another in direction of the optical axis 29 of the reflector 11. The receptacle 18 has two strips 28 which is arranged parallel in the same horizontal arrangement relative to one another. At their sides facing toward one another they are provided with guiding grooves 31 which extend parallel to the optical axis 29 of the reflector 11 and open toward one another.

Arms 32 are formed on the support 23 at two opposite sides and engage in the guiding grooves 31 so that the support 23 is displaceable in direction of the arrow 33 in the receptacle 18. The width of the guiding grooves 31 reduces in the displacement direction as shown in FIG. 5. The arms 32 of the support 23 are curved transversely to the displacement direction 33 and provided at their lower sides with flat sliding surfaces 34 for abutting against a lower limiting wall 36 of the guiding groove 31. The curvature of the arms 32 abuts against the upper limiting wall of the guiding groove 31, and the curvature in the guiding groove is elastically stretched in correspondence with the width of the guiding groove. During displacement of the support 23 in the receptacle 18 the arm 32 is clamped automatically in the guiding groove 31 and clamps the support 23.

The receptacle 18 can be formed so that the depth of the guiding grooves or in other words the width of the receptacle reduces in the displacement direction 33, and the arms 32 on the support 3 are formed so that they are elastically compressed relative to the support 23. Also in this embodiment the support 23 is clamped by the arms 32 during displacement in the receptacle 18.

The cover glass 38 of the water level 19 is a part of an outwardly curved spherical outer surface. The central point M of the spherical outer surface is laterally offset relative to the vertical axis 24 through which the center point of the round disc extends. Therefore, the air bubble 20 with correctly adjusted inclination of the reflector 11 is not located in the center of the water level 19 but instead is laterally offset relative to the same. The air bubble 20 of the water level is shown in FIG. 3 in two different positions. In the position of the air bubble 20 shown in a broken line the reflector 11 is strongly inclined upwardly. When the reflector 11 is turned downwardly by the displacing elements, the air bubble 20 moves both transverse to the lines of the line scale 27 and also parallel to the same. The inclination of the reflector is correctly adjusted when the air bubble 20 is located between both central line markings on the cover 26. With this design of the water level 19 a great indicating region is produced with low sizes. In other words, deviations of the inclinations of the reflector from the correct inclination up to several degrees can be read with high accuracy on the water level.

During assembly of the headlamp the reflector 11 is correctly adjusted by means of suitable testing device and the water level 19 is regulated during this adjustment of the reflector by turning the same inside the support 23 until the air bubble 20 is located between both central line markings. Due to the eccentricity of the spherical outer surface of the cover glass 38 the air bubble travels during a rotation of the water level 19 so that an adjustment is possible. After required adjustment the water level 19 is permanently fixed in the support 23, for example by glueing.

In the second embodiment shown in FIGS. 6, 7 and 8 the water level 41 is curved over its whole periphery outwardly in arched manner and arranged on a support 42. The support 42 has a cylindrical mandrel 43 insertable in the receptacle 44 on the reflector 11 which is cylindrical in correspondence with the mandrel. The receptacle 44 is provided with a longitudinal recess 46 and expanded radially elastically and the mandrel 43 is provided with several longitudinal slots 47 and compressible radially elastically. The mandrel 43 is provided with a somewhat greater diameter than the receptacle 44 and is clamped in the same. The water level 41 is arranged in the support 42 so that its longitudinal axis 48 deviates from the central axis 29 of the mandrel 43 by a small angle $\alpha$. A reflector specific fine adjustment of the water level 41 is performed by turning of the support 42 in the receptacle 44. During turning the water level 41 performs a wobble movement and the inclination of the water level 41 is changed, therefore a movement of the air bubble is performed. The water level 41 is provided with a line scale 51, and values for the inclination angle of the reflector 11 associated the line scale are provided on the support 42.

In a further embodiment shown in FIGS. 9 and 10 a water level 54 is curved outwardly in arched-manner and arranged on a support 55. The receptacle 53 has a vertically arranged slot 56 extending parallel to the optical axis 29 of the reflector and open at one end. The support 55 is provided with a disc shaped portion 57 insertable in the slot. At the closed end of the slot 56 it comes to abutment with its end side which lies transverse to the vertical. The portion 57 is circularly shaped and the annular slot 56 is also circularly shaped for receiving of the portion 57, so that the support 55 is arranged turnably in the slot 56. The support 55 is held in the slot 56 by a screw 58. The longitudinal axis of the water level 54 extends in the longitudinal direction of the slot 56 parallel to the optical axis 29. The water level 54 can be turned over the disc-shaped portion 57 and therefore adjusted. After the adjustment of the water level 54 the support 55 is clamped with the screw 58 in the slot 56.

It will be understood that each of the elements described above, or two or more together, may also find a useful application in other types of constructions differing from the types described above.

While the invention has been illustrated and described as embodied in a headlamp for power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlamp for a power vehicle, comprising a reflector mountable in a chassis and turnable for adjusting its inclination; a water level provided on said reflector for indicating its inclination, said water level having adjusting marks and being displaceable relative to said reflector for reflector specific fine adjustment; a support insertable in said reflector and receiving said water level, said water level having an outer side and provided on said outer side with a cover glass forming a part of an outwardly curved spherical surface, said water level being turnable in said support for fine adjustment about a vertical axis.

2. A headlamp as defined in claim 1, wherein said spherical outer surface has a central point which is laterally offset relative to a vertical axis.

3. A headlamp as defined in claim 1, wherein said reflector has a receptacle in which said support is insertable, said receptacle being provided with guiding grooves extending in an insertion direction at opposite sides of said support, said support having laterally projecting arms guided in said guiding grooves.

4. A headlamp as defined in claim 3, wherein said guiding grooves reduce in the insertion direction, said arms of said support being elastically deformable transversely to said reducing so that said arms during insertion in said guiding grooves are clamped in said guiding grooves.

5. A headlamp as defined in claim 4, wherein said arms are curved transverse to the displacement direction and have flat guiding surfaces, said guiding grooves having a limiting wall toward which said guiding surfaces face.

6. A headlamp as defined in claim 3, wherein said guiding grooves extend substantially parallel to an optical axis of said reflector.

7. A headlamp for power vehicle comprising a reflector mountable in a chassis and turnable to adjust its inclination; a water level provided on said reflector for indicating its inclination and having adjusting marks, said water level being displaceable relative to said reflector for reflector specific fine adjustment; a support insertable in said reflector and supporting said water level, said water level being arch-shaped, said reflector having a receptacle for inserting of said support and extending substantially parallel to an optical axis, said support having a cylindrical mandrel insertable in said receptacle and is turnable in said receptacle for fine adjustment of said water level, said water level having a longitudinal axis extending at an angle relative to a longitudinal axis of said receptacle.

8. A headlamp as defined in claim 7, wherein said receptacle is radially elastically expansible and provided with a smaller diameter than said mandrel, so that said mandrel is clampable in said receptacle.

9. A headlamp as defined in claim 7, wherein said mandrel of said support is radially elastically compressible, said receptacle having a smaller diameter than said mandrel, so that said mandrel is clampable in said receptacle.

10. A headlamp as defined in claim 7, wherein said water level in said support is permanently fixable in said receptacle after a fine adjustment.

11. A headlamp for power vehicle, comprising a reflector mountable on a chassis and turnable for adjusting of its inclination; a water level provided on said reflector for indicating its inclination and having adjusting marks, said water level being displaceable relative to said reflector for reflector-specific fine adjustment; a support insertable in said reflector and supporting said water level, said water level being arch shaped, said receptacle having a vertically extending slot arranged parallel to an optical axis of said reflector and formed so that a vertical disc shaped portion of said support is inserted in said slot, said portion having end sides extending transverse to the vertical and formed as circular curves, said slot having a limiting wall adjoining said end sides and also formed as circular arc, said support being clampable in said slot.

12. A headlamp as defined in claim 11, wherein said slot has a limiting wall; and further comprising a clamping screw, said support being clampable in said slot between said clamping screw and said limiting wall.

13. A headlamp as defined in claim 11; and further comprising a housing provided with an observation window, said reflector being arranged in said housing so that said water level can be readable from outside of said housing through said observation window.

14. A headlamp as defined in claim 11; and further comprising a housing which has at least a transparent portion, said reflector being arranged in said housing so that said water level can be readable from outside of the housing through said transparent portion.

15. A headlamp as defined in claim 11; and further comprising a housing having a rear opening; a cover cap closing said rear opening and being transparent, said reflector being arranged in said housing so that it can be readable through said cover.

* * * * *